SAMUEL H. HAMILTON.
Improvement in Corn-Planters.
No. 127,871. Patented June 11, 1872.
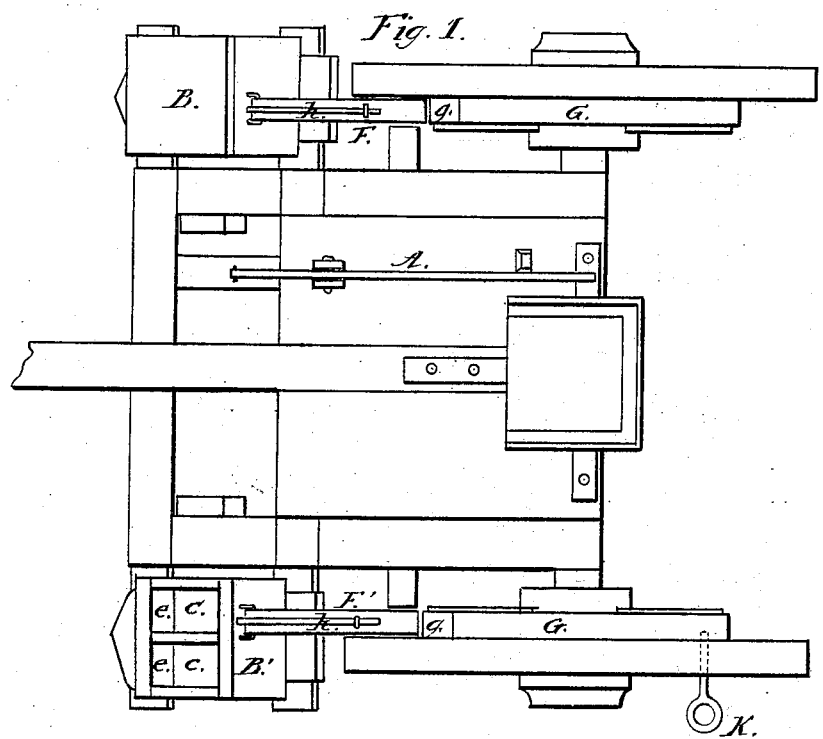
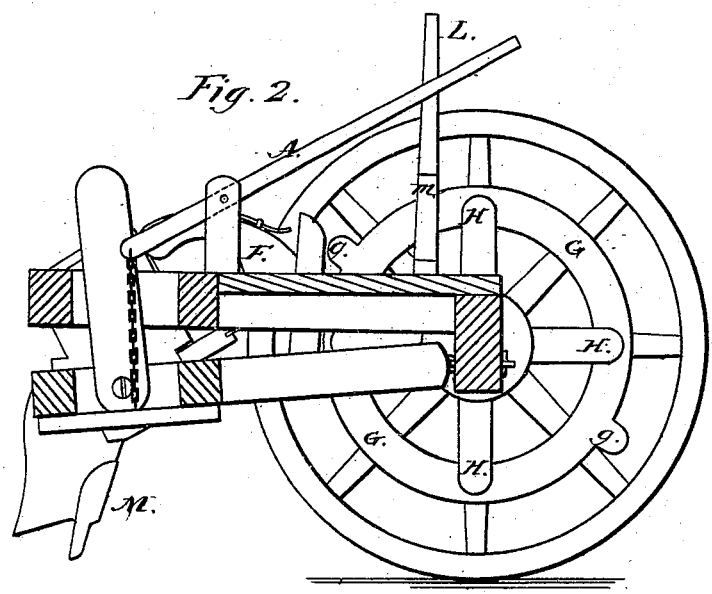
Witnesses: Inventor:

127,871

UNITED STATES PATENT OFFICE.

SAMUEL H. HAMILTON, OF DEERFIELD, NEW JERSEY.

IMPROVEMENT IN CORN-PLANTERS.

Specification forming part of Letters Patent No. 127,871, dated June 11, 1872.

*To all whom it may concern:*

Be it known that I, SAMUEL H. HAMILTON, of Deerfield, in the county of Cumberland and State of New Jersey, have invented a new and useful Improvement in Corn and Seed Planters and Fertilizers; and I do hereby declare that the following is a full, clear, and exact description of the same, reference being had to the accompanying drawing and to the letters of reference marked thereon, in which—

Figure 1 represents a plan view of my device. Fig. 2 is a longitudinal section.

My invention relates to an improvement in seed-planters and fertilizers; and consists of a vehicle of the usual form mounted on wheels supported by an axle, the whole to be drawn by horse-power over the ground to be planted with seed and prepared fertilizer.

Similar letters denote like parts in the drawing.

Upon the axle-tree of the vehicle I erect a platform, from which extends a tongue or shafts. Upon this platform I arrange a seat for the driver. The lever A, within reach of the driver's hand, is intended to lift the plows from the ground, and to be held so when the planter is not in operation. The seed-boxes B B' are arranged on either side of the vehicle, so that two rows of seed may be planted at the same time, the slides moving in the seed-boxes being operated simultaneously. Within the seed-boxes B B' are slides $c\ c$, forming valves to open and close at stated intervals to distribute the seed uniformly throughout the field to be planted. The slides moving in the seed-boxes have slots $e\ e$ formed in them, which open into the space formed within the plow as they are moved back and forth. Curved levers F F', attached to the seed-box at their backs, are also hinged to the slide-valve, and to operate the same back and forth as the said lever is operated by the cams $g$ attached to the wheels of the vehicle. About the inner part of the hub of the wheels I arrange guides H, radiating from the same, which support circular rings G G, which have radiating from them lugs $g$, which serve the purpose of cams to operate the slide in the seed-boxes as they come in contact with the curved levers F F on either side of the vehicle. These levers F F are pressed down by the lugs, which come in contact with the curved contour of these levers and force them down. The lower part of these levers being attached to the slides in the seed-boxes they are moved in and out as the lever is affected by the lugs on the ring attached to the wheels of the vehicle. The curved levers have bearing upon them strap-springs, which serve to return them to their places after they have been operated or pressed down by the lugs $g$ on the ring G surrounding the hubs of the wheels. The rings which surround the inner part of the hubs of the vehicle can move independently of the wheel when the planter is not in active operation, or they can be made to act by the motion of the wheels by simply tightening the screw which passes through a spoke on each of the wheels of the vehicle. The plow is of the ordinary form, and is intended to enter the soil to a depth sufficient to plant the seed. A shoe or drag follows the plow, it being attached loosely to the back of the same for the purpose of covering the row after the seed has been planted. Immediately behind the plows of the planter I suspend shoes M, which are intended to cover the rows. An upright, L, having a slot, $m$, serves to catch and return the lever A, which lifts the plows from the ground while the planter is not in operation.

In operating, the corn or grain is put in the seed-boxes of the planter, and, before entering the field, the screw K, which is intended to fix the circular ring surrounding the inner part of the wheel-hubs, is tightened to keep the circular ring from moving independently of the wheels. The lever with which the driver lifts the plow from the ground is allowed to swing freely, so that the plows may rest on the ground before the vehicle enters the field. The horses are started, and the wheels of the vehicle move over the ground, carrying with them the circular ring surrounding the hubs of the wheels. The lugs attached to these circular rings in their circuit come in contact with the curved contour of the levers and force them down. The slides attached to these levers are in turn pressed or moved forward, and their slots, moving beyond the opening in the seed-box, close the openings through which the seed falls. When the lug has passed the curved lever the spring bearing on the same returns the lever to its place and opens the slot in the slide and allows a certain number or amount of seed to fall through the opening in the plow to the ground before the slot is closed again. The circular ring which surrounds the hub of the wheel has, as shown in my model and drawing, two lugs, although more or less may be used, as may be required. The more lugs there are on the circular ring the oftener the seed will be dropped.

Having thus fully described my invention, what I claim as new, and desire to secure by Letters Patent, is—

The circular ring G surrounding the hubs of the wheels, in combination with the guides H H and the screw K, as and for the purpose set forth.

In testimony whereof I have signed my name to this specification in the presence of two subscribing witnesses.

SAMUEL H. HAMILTON.

Witnesses:
CHARLES F. McQUILTIN,
WILLIAM H. HAMILTON.